United States Patent Office.

THOMAS C. SCRUTON, OF FARMINGTON, NEW HAMPSHIRE.

Letters Patent No. 100,931, dated March 15, 1870.

IMPROVED CATARRH REMEDY OR SNUFF.

The Schedule referred to in these Letters Patent and making part of the same

To all whom it may concern:

Be it known that I, THOMAS C. SCRUTON, of Farmington, in the county of Strafford, and State of New Hampshire, have invented an Improved Composition for Catarrh-Snuff; and I do hereby declare that the following is a full and exact description of the ingredients thereof, and of the mode of compounding the same.

The ingredients of the snuff are, the leaves of the kalmia latifolia, dried and powdered; refined borax, powdered; and oil of checkerberry, peppermint, bergamot, or some other essential oil of agreeable fragrance.

Different essential oils may be used, to suit the preference of different individuals, or a mixture of two or more essential oils in amount equal to the proportion herein specified.

The proportions of the ingredients employed are as follows:

Kalmia latifolia, (leaf-powder,) eight ounces.
Borax, one-half ounce.
Essential oil, one-eighth ounce.

These proportions may be varied if preferred.

The leaves, which are evergreen, after being gathered and thoroughly dried, are finely pulverized. Then the borax, previously pulverized, is well mixed therewith. Finally, the essential oil is mingled with the powder. The snuff is then ready for use.

What I claim as my invention, and desire to secure by Letters Patent, is—

The composition of ingredients for a catarrh-snuff, substantially as herein specified.

Specification signed by me November 15, 1869.

THOMAS C. SCRUTON.

Witnesses:
DANIEL C. MELLOWS,
JOSIAH B. EDGERLY.